INVENTORS
Paul D. Leeke
David A. Bixler
By Smyth, Roston & Pavitt
Attorneys

INVENTORS
Paul D. Leeke
David A. Bixler
By Smyth, Roston & Pavitt
Attorneys.

3,445,832

MAGNETIC TAPE CONTROL SYSTEM FOR MULTIPLE TAPE, UNINTERRUPTED RECORDING AND REPRODUCING

Paul D. Leeke, Ventura, and David A. Bixler, Camarillo, Calif., assignors to Minnesota Mining and Manufacturing Company, St. Paul, Minn., a corporation of Delaware Filed Apr. 29, 1965, Ser. No. 451,779
Int. Cl. G11b *5/00*
U.S. Cl. 340—174.1 13 Claims

ABSTRACT OF THE DISCLOSURE

A system is disclosed for providing uninterrupted recording and reproducing of data on magnetic tape. A signal of monotonically varying frequency is concurrently recorded on the end of one and the beginning of another tape, as the same data are recorded on the two tapes during this changeover period. During reproducing, the second tape is started when the end of the first tape approaches. The reproduced control signals are compared and processed to generate a reference signal for the control of the drive for the second tape. When the tapes run in phase synchronism, this reference signal is or is made phase-coherent with another reference signal derived from a source for subsequently controlling the drive of the second tape, whereupon the control is turned over to that source of reference signal.

The present invention relates to magnetic tape transducing systems. More particularly, the present invention relates to a system that permits uninterrupted recording of data on magnetic tapes, whereby the data flow continues for an indefinite period of time and the total amount of data to be processed exceeds the storage capacity of a single tape.

Whenever a data source furnishes data for an indefinite period of time, particularly for a period the end of which is uncertain, and if the capacity of a magnetic tape used in a first system approaches its end, means are required and have to be devised which permit continued recording of data without interruption, and in such a manner that the data can be reproduced later on without interruption, skipping or repetition. In other words, it has to be avoided that when the end of the capacity of the first tape in a system I has been reached so that another tape unit takes over to receive data, no data gap must appear and no data must be lost in the transition process. This is not merely accomplished by ensuring uninterrupted recording, but it is necessary to take into consideration that during reproducing likewise no data gap must appear. Specifically, during changeover from one tape to the next one, data must not be lost, i.e., skipped over nor repeated. This means specifically that the end of the tape in the first system, I, must be somehow synchronized to the beginning of the new tape in the second system which is to take over the recording. More specifically, it is necessary to provide concurrent recording of the same data on an extended end portion of the tape in system I and on a corresponding portion of the beginning of the tape in the second system, II. Additionally, it is necessary to ensure a phase locking relationship during playback of the end of the tape of system I and the beginning of the tape of system II.

According to the invention, it is, of course, essential that means are provided for the recording mode which permit concurrent recording of data on an end portion of one tape and on the beginning of the second tape. The second tape has to be started to run as the first tape approaches its end. Still concurrently with the recording of the data on both tapes, a position representing signal is recorded on both tapes uniquely identifying sequential increments of the tapes over extended portions thereof. The position identifying signal permits full correlation of such tape portions as to the data concurrently recorded thereon.

Specifically, the position representing signal may be a sweep frequency signal, i.e., a signal the frequency of which varies in time in accordance with a monotonic function. The frequency may increase, preferably but not necessarily linearly, from a first frequency up to a second frequency. The sweep is being run through only once and rather slowly, so that for the extended portions on both tapes any data units as concurrently recorded are associated with a particular instantaneous frequency value of the concurrently recorded position representing signal. Control means are provided for the reproducing mode to respond to the position representing signal on both tapes. Here, of course, data are first reproduced from one tape, and when its end has been reached the second tape is being started. The two-position representing signals are picked up, and any difference such as a difference in frequencies is an indication that one tape leads or lags relative to the other one. Since the position representation is to be a unique one over the extended portions of the tapes as far as each tape increment is concerned, leading or lagging can readily be determined by comparing the individual reproduction of the two-position representing signals on the two tapes. An error signal is formed which influences one of the tapes, preferably the second one so as to avoid disturbance of reproduction of data which are still exclusively drawn from the first tape. The second tape is in a position or phase lock relative to the first tape during the reproducing mode, when the position of the first tape relative to the second tape is the same as during the recording mode, then the two position representing signals must be equal at any instant. This, in turn, is an indication that the same data can be reproduced on both tapes, and upon switching over from one tape to the other, data will neither be skipped over nor repeated.

Usually, a source for a standard frequency reference signal is used to individually position control an individual tape during any of its normal operating modes. For the synchronization procedure, as between two different tapes, the second, newly started tape is at first not positioned controlled from this source, but the two position representing signals drawn from the two tapes are used to form an A.C. signal which has a frequency identical with the standard reference frequency when the two position representing signals are equal at any instant, but this formed A.C. signal will have a different frequency, when the second tape leads or lags, relative to the first tape as compared with the recording mode.

The control signal formed out of the two position representing signals is then used as reference signal for the position control of the second newly started tape. When the two tapes are phase locked in the desired position, the reference signal as formed will be identical with that furnished by the standard source, with the exception of a slight phase error, which is immaterial for correlation of data on the two tapes at that point. Now reproduction can be switched over to the second tape, and subsequently the control linkage between the two tapes is broken.

The invention finds utility whenever the duration of data flow exceeds the time limit defining the capacity of a single tape unit. It is of specific interest, that physical proximity of the two systems is not required. Moreover, the sweep frequency signal providing the position representation for the two tapes may still be at a different location. For example, the tape units may be located in different satellite tracking stations each one operating preferably when reception of the signal from a satellite is at optimum. The satellite furnishing the data to be recorded may also furnish the frequency sweep signal received at either station in strict concurrence with the data received, and this way it is possible to uninterruptedly record the output signal of the satellite in such a manner, that at playback, no problem arises as to the "coupling" of sequentially recorded tapes. It can be seen that in this case the extent of the capacity of the tape in each unit is not the controlling factor for changeover, but optimum reception at each station will determine changeover. Furthermore when in this specification reference is being made to any concurrent recording, this should be understood as including a possible time lag resulting from any difference in distances from the data source (for example a satellite) to the recording stations.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing, in which:

Figures 1, 2:
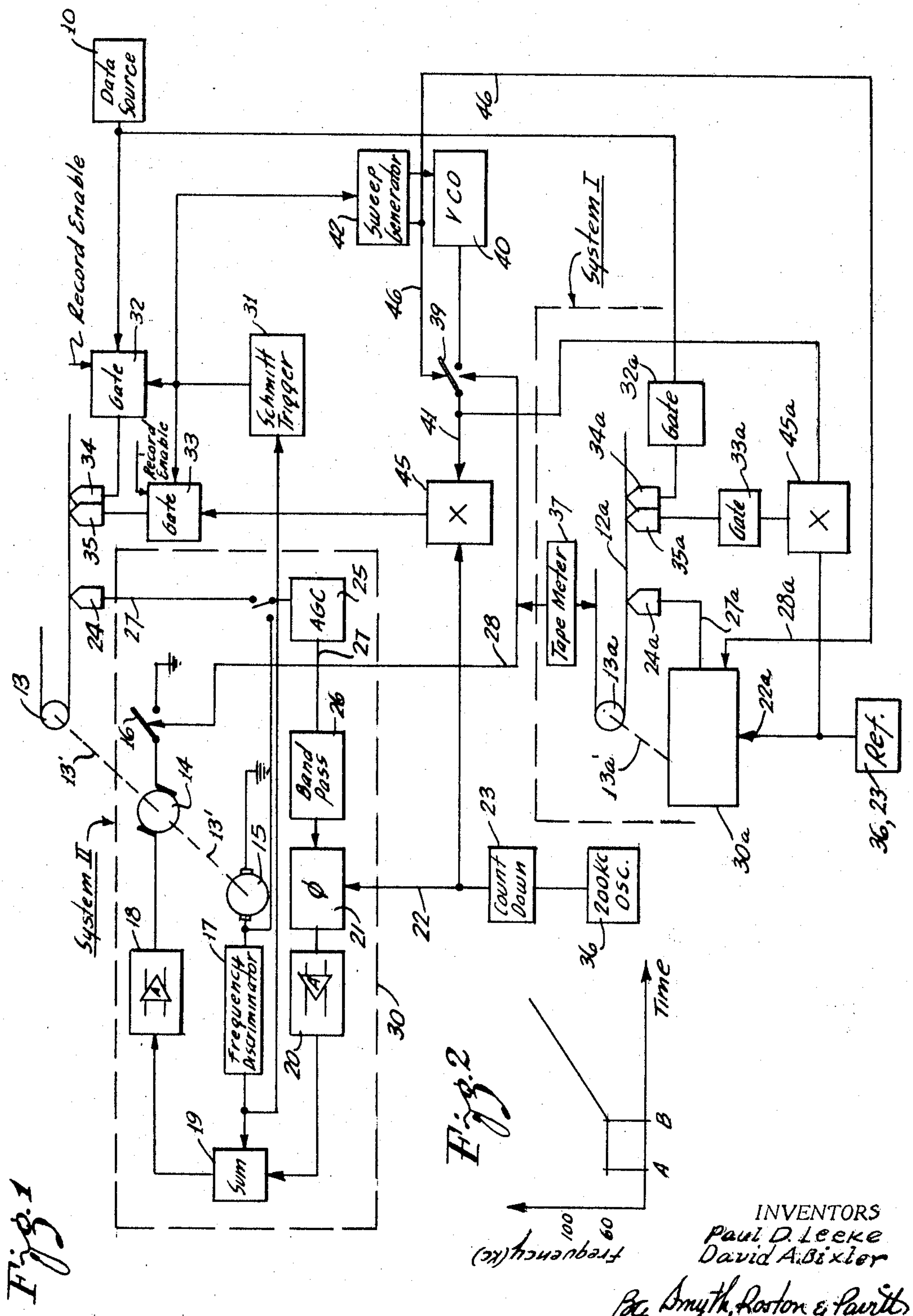
FIGURE 1 illustrates schematically a block diagram of a system which permits the concurrent recording of position representing signals on two tapes while data are recorded concurrently.
FIGURE 2 illustrates a frequency vs. time diagram of an example for a position representing signal used and recorded in the system shown in FIGURE 1.

Proceeding now to the detailed description of the drawing in FIGURE 1 thereof there is shown a block diagram illustrating a tape synchronizing system for the purpose of providing extensive recordings in an uninterrupted mode and independent from the capacity of any individual tape within any individual tape recording unit.

Basically, in FIGURE 1, there are shown a common data source 10 and two independent tape recording and reproducing systems I and II. It is the specific purpose of additional equipment as provided to operatively "couple" the end of a magnetic tape 12*a* in system I to the beginning of another magnetic tape, 12 in system II in such a manner and under such conditions that (1) in the recording mode no interruption of data recording occurs when the capacity of the tape in system I has been exhausted; that (2) data from source 10 are to be recorded in such a manner that subsequently uninterrupted reproduction is made possible, without skipping or repetition of data even though the tapes are reproduced with different machines; that (3) the tape systems may be physically remote from each other during recording, i.e., there is no possibility to physically connect the tapes together; that (4) there is no possibility of stopping the flow of data of source 10.

In FIGURE 1, the tape motion control for system II only is shown in greater detail, since the invention is principally concerned with means enabling a subsequently started tape (here 12) to phase lock to a running tape (12*a*), by appropriately controlling the motion of the tape (12) to be phase locked. This concerns primarily system II and generalization requires that system II be controlled specifically without having to take any specifics of system I into account and without making any specific requirements for system I beyond those outlined in detail below. System I may have components similar to system II. As will be developed below, it is not necessary, that the system are structurally similar, so that different tape systems can be "coupled" together for providing uninterrupted recording. The only requirement is that the systems be compatible in the sense that they can respond to the linking network that provides the coupling.

It is specifically assumed and will be described that a changeover for recording is to occur from system I to system II, i.e., from tape 12*a* to tape 12. Thus, at any instance, data from source 10 will at first flow through a gate 32*a* to a data transducer 34*a* of system I for recording on tape 12*a* which is driven by a capstan 13*a*. At that time, tape 12 is wound on a payout reel, not shown, provided in system II in a conventional manner, and this tape 12 will be at rest and will not move, as long as recording on the major portion of the tape 12*a* in system I is in progress.

Tape 12 can be advanced by a capstan 13 driven by a suitable electric motor 14 having seated on its driving shaft 13' an A.C. tachometer 15 which produces an output signal the frequency of which is indicative of the speed of motor 14.

As is symbolically denoted, there is provided a switch 16 with the aid of which, for example, the motor 14 is connected to ground for purposes of starting, while an open switch 16 prevents motor 14 from running. A signal line 28 transmits a command for operating the switch 16. In its simplest form, switch 16 may be a gate with line 28 furnishing the gate-open or gate enabling signal.

In order to provide speed control for motor 14, there is provided a frequency discriminator 17 producing a D.C. output signal zero as long as the motor 14 has the desired rated or normal speed. The output of the frequency discriminator 17 is fed to the input of a multistage amplifier 18 which may include an error signal amplifier stage and a power amplifier stage, providing sufficient gain for purpose of driving motor 14 during normal runs as well as during acceleration and deceleration phases.

In particular, of course, the adjustment of amplifier 18 is to be made in such a manner that for input error signal zero the motor 14 is driven at rated speed, so that for input zero a specific voltage and current is supplied to the armature of motor 14. Network 18 may include compensating circuitry to prevent the system from hunting. The output signal of frequency discriminator 17 is not fed directly to the input of amplifier assembly 18 but there is interposed a summing point or network 19 feeding to the input of amplifier 18 the respective largest one of any of its respective input signals.

One of the input signals of the summing network 19 is the output of frequency discriminator 17, while a second input is furnished by a loop amplifier 20 receiving an input signal of relatively low power from a phase detector 21. Detector 21 has a reference signal input terminal 22 to which is connected a count down or reference binary formation network 23 which in turn is connected to reference signal oscillator 36.

For precision recording it is necessary to use a separate track on tape 12 for the recording of a reference signal, i.e., a so-called sync track. This sync track is used for providing accurate position control of the tape 12. It is not only necessary that the tape 12 is being driven at a particular constant speed, but also its position at any instant must be defined precisely in order to bestow upon the tape maximum capabilities as to power of resolution as far as the data to be recorded is concerned.

Thus, in system II there is provided a magnetic transducer 24 which monitors the sync track, if any, on the tape, which transducer 24 provides an output signal which at rated speed has a frequency precisely that of the frequency of a constant frequency reference source at the time of recording. In the present example the sync frequency is presumed to be 25 kc., so that at rated speed the transducer 24 furnishes the 25 kc. output signal into a line 27. The signal in line 27 is subjected to AGC control by an AGC network 25.

The synch track on tape 12 is recorded by means of a transducer 35 receiving a recordable reference signal from oscillator 36, and count down device 23 through a gate 33 when open. A data recording transducer 34 provides parallel data tracks.

Since, as will be explained more fully below, the sync track may include not only the 25 kc. reference signal but another type of signal, it is necessary to subject the signal from the synch track reading transducer 24 to filtering action, and for this purpose a band-pass filter 26 is provided having a range which can be rather narrow because this signal is not used for frequency or speed control but for position control only, and therefore, only a 25 kc. signal is needed here so that the band-pass characteristic of this band-pass filter 26 may be narrow indeed.

Since sophisticated tape units permit operation at different tape speeds, the unit 26 may include a number of band-pass filters individual connectible to line 27 to different frequencies as resulting from the reproduction of the tape synch signal at a tape speed different from the recording speed. The output signal of this band-pass filter or unit 26 is fed to the second input line or terminal of the phase detector 21. In case the system permits such operation at different speeds, the unit 26 may include an adjustable frequency divider or multiplier so that the input signals (tape binaries) for detector 21 are always within the same frequency band.

These elements as described thus far complete a speed and position control loop or loop for the motor 14 and tape 12 during any normal operation. The elements 14, 15, 16, 17, 18, 19, 20, 21, 25 and 26 together constitute the drive unit 30 for capstan 13 and tape 12. In order to facilitate the description, similar drive units may be employed in systems I and II. Unit 30 has altogether three inputs and one output. The inputs are, the reference signal input line 22, the tape binary signal input 27, and the motor stop-start command input 28. The output, of course, is the shaft 13' for capstan 13 to drive the tape 12 in system II. Line **22*a*, 27*a* and 28*a* are the coresponding input connections for the drive unit 30*a* for system I, and 13'*a* is the output drive shaft for capstan 13*a* of system I. Aside from its drive unit 30*a*, system I may have its own reference binary source 36*a*–23 used also for recording tape binaries at any frequency (not necessarily 25 kc.). Similarity of the systems may be assumed as stated but for linking the two systems it is necessary only that drive unit 30*a* has an input command line 28*a* for starting and stopping which, of course, is self-evident. Any means providing tap position control in system I recording are not essential. If position control is provided, then a gate 33*a* may govern transmission of the reference signal to be recorded by a synch track recording transducer 35*a* on tape 12*a*. The multiplex network 45*a* connected ahead of gate 33*a*** has a purpose to be explained below.

As long as system I operates in its own normal recording mode, a synch track may be recorded concurrently with the data from source 10. Again, this is not essential, but it is essential, that a track on tape **12*a*** is set aside for purposes of phase lock control to be described below. The remaining elements of FIGURE 1 will be described upon describing the events that transpire when during recording the tape in system I approaches its end.

The system I, as all tape units in general are, is equipped with a tape metering device 37 which does not have to be too accurate, and which approximately and within certain tolerances gives an indication of the amount of tape that is still available in system I for recording. When this amount has decreased to a certain value, a switch in tape meter 37 will be actuated which produces a command signal fed into the line 28 to close the switch 16 in unit 30 of system II to start motor 14 therein. This provides for the first linkage between the two systems. Since, of course, at this time the speed of motor 14 is zero, the frequency discriminator 17 furnishes its maximum output signal providing a maximum error signal input for the amplifier 18, and the motor 14 starts at a very rapid rate.

The motor 14 will soon come up to full or rated speed, and the output of frequency discriminator 17 will drop accordingly. Depending upon the gain and bias adjustment as between the discriminator 17 and amplifier 18, at rated speed there is a specific input for amplifier 18 to furnish an output current for motor 14 to run at rated speed. The output signal of frequency discriminator 17 that is indicative of rated motor speed is used further in that it actuates or deactivates as the case of adjustment may be, a trigger 31, for example, a Schmitt trigger. This trigger circuit now enables a first gate 32 and a second gate 33.

The gate or switch 32 when enabled connects the data source 10 to the data recording transducer system 34 inscribing the data track or tracks on tape 12. At this point, the data gate **32*a* in system I is still open so that the data flow from the source 10 into the system I for purposes of recording onto the tape 12*a*** in system I still continues, thus the same data are recorded on both tapes.

The switch or gate 23 connects the sync track recording transducer 35 to the source of reference signals 36 via the count down network 23 providing the 25 kc. reference binaries referred to above. It should be mentioned, that this reference signal as recorded has a frequency which is made dependent upon the tape speed in case the device is equipped with a variable speed drive. Representatively, the reference signals as recorded is 25 kc. at a tape speed of 15 i.p.s., 12.5 kc. at 7.5 i.p.s., 50 kc. at 30 i.p.s., 100 kc. at 60 i.p.s. and 200 kc. at 120 i.p.s. When in the following the tape binaries are referred to as constituting a 25 kc. signal, it will be understood that this is only a representative example of one mode of operation. Thus, the 25 kc. signal is now being recorded by the transducer 35 onto the sync track set aside on tape 12 for this purpose. Specifically, this recording commences when tape 12 has reached rate speed.

Soon, the sync track reading transducer 24 will pick up the recorded reference binaries on the tape 12, and after AGC control operation in unit 25, the band-pass filter 26 feeds the tape binaries into the phase detector 21 receiving at its input 22 also the 25 kc. reference signal. Alternatively, in the record mode the AGC input may be connected to the output of tachometer 15, while in the reproducing mode, the AGC input is furnished with the output signal read from the tape by transducer 24. For reasons of convenience, the input of AGC 25 will always be referred to as tape-binaries.

As long as there is a difference in phase between the signals fed into the two inputs of phase detector 21, a D.C. output signal is produced, amplified by loop amplifier 20 and provided from there to the summing point 19. At the time rated speed had been reached the output of frequency discriminator 17 is zero or at minimum value, but there may be a phase difference as between reference signal and tape binaries, and the resulting error signal produced by the detector 21 and amplifier 20 now overrides any other signals fed to summing point 19 and into the amplifier 18, to temporarily adjust the speed of motor 14 until the phase detector 21 furnishes output zero. This being the normal speed and position control for the tape 12.

At the time the tape **12*a* in system I approached its end, i.e., at the time the command signal was produced in line 28 by meter 37 to start up the motor 14 of the second system, an additional command signal is provided to close a switch 39 thereby operatively coupling a voltage controlled oscillator 40 to a line 41 which feeds an A.C. voltage having a frequency of, for example, 60 kc. into the system I. Particularly, the steady 60 kc. signal is passed into the multiplex network 45 for concurrent recordation on tape 12*a* multiplexed with the sync signal as provided on the tape 12*a* by transducer 35*a* in sysem I. Specifically, for linking it is merely required that system I is capable of receiving and recording the 60 kc. signal in line 41**. At this time this sync signal of 60 kc. remains constant.

The particular output signal of this VCO 40 is plotted in FIGURE 2. At the time A, meter 37 signalled the approach of the end of the tape **12*a* in system I, and, in particular, the switching pulse or signal was produced in command line 28 at this time A to close switches 16 and 39. As was described above the motor 14 is system II started up at that time. The motor 14 will have reached rated speed at time B, which is the time of response of trigger 31 to open gates 32 and 33. In the meantime, i.e., in the period in between times A and B during which motor 14 accelerated, the 60 kc. signal from VCO 40 is multiplexed into reference signal to be recorded on tape 12*a* in system I. As was described above, at this time B the two gate switches 32 and 33 were closed by operation of Schmitt trigger 31 so as to provide to the tape 12 pertaining to the second system data proper from source 10 as well as the 25 kc. reference binaries for recording in the sync track of tape 12. The output of trigger 31 is also fed to, for example, a one-shot sawtooth generator 42** having a fixed time constant and providing a voltage which increases approximately linearly with time, while dropping practically instantaneously to zero at the end of the period.

The specific configuration of this device 42 is not critical. Its function is to provide a voltage increasing, for example, linearly in time upon receiving a trigger signal while returning to the original state after a predetermined period of time. Since, for example, monostable multivibrators are equipped with an RC circuit wherein a substantially linearly rising voltage is produced during the astable period, this voltage can be tapped and used as output. Thus, the implementation of this one-shot sawtooth generator is conventional indeed.

The output of device 42 is thus a voltage (possibly ground potential) which is constant at first during the stable or normal state, and prior to triggering by Schmitt trigger 31; thereafter the output signal of device 42 rises to a second voltage from which it drops instantly back to the first voltage level and stays at that level until another trigger signal appears. This output voltage is the input voltage controlled oscillator 40. The first output signal voltage level of device 42 enables the VCO 40 to furnish the constant 60 kc. reference output, this being merely a problem of bias adjustment. Upon response of Schmitt trigger 31, the sawtooth oscillator or generator 42 is triggered (time B) and begins to furnish a rising voltage. Accordingly, the output frequency of VCO 40 begins to rise and preferably also in a linear manner. This is also plotted in FIGURE 2.

The system II is also provided with a multiplex network 45 combining the 25 kc. signal from source 36–23 with the output of VCO 40. Thus, at the time that the switch or gate 33, closes the sync signal recording transducer 35 does not only receive the reference signal from source 36–23, but by virtue of multiplexing, the VCO output is superimposed or mixed into the reference signal for recording into the synch track on tape 12.

It will now be understood why the 25 kc. band-pass filter 26 has to be provided for; for purposes of normal position control action as provided by the phase detector 21, this recorded VCO signal must not interfere with the operation of the phase detector 21 for position control for tape 12. The position of motor 14 and of tape 12 at that time still is exclusively controlled by the 25 kc. reference binaries as recorded onto the tape 12, and the band-pass filter 26 rejects the reproduction of the VCO output signals which, of course, is also picked up by the synch track read transducer 24.

The constant VCO output signal was previously already recorded on tape **12*a*, beginning with time A when system II was started. Now, the signal of rising frequency is likewise recorded on tape 12*a*. Specifically, the sweep frequency signal from VCO 40 is concurrently recorded on tapes 12 and 12*a***.

Thus, at the time that the tape 12 attains rated speed (time B) four important events occur. First data are recorded on both tapes, i.e., on the tape **12*a* in system I as well as on tape 12 in system II. Second, gate 33 opens and permits output of multiplex 45 to pass to recording transducer 35 in system II, which output includes the 25 kc. synch signal from reference sources 36–23 as well as any VCO signal in line 41. Third, the sawtooth oscillator or sweep voltage generator 42 is triggered, so that the output frequency of VCO 40 begins to rise at the same time when switch 33 closes, so that the multiplexed signal as recorded by transducer 35 includes particularly the continuously rising frequency signal as derived from VCO 40, and beginning with a 60 kc. cycle signal while increasing in frequency steadily therefrom. Fourth, the same sweep frequency signal, i.e., the VCO output of rising frequency is also recorded on the tape 12*a*** in system I.

Since the same signal, i.e., the same VCO output signal is recorded concurrently on the tapes in both systems such recording takes place in strict phase synchronism with the data then recorded at the respective end portion of tape **12*a* in system I and the beginning portion of tape 12, so that an accurate position correlation of recorded data is provided on both tapes enabling identification and correlation of every individual incremental portion of the end of tape 12*a* and the beginning of tape 12**.

The rising time of this sawtooth oscillator 42 may be very slow in comparison with the frequencies otherwise discussed, i.e., the output of this sawtooth generator may reach its end after about 30 seconds or thereabouts. It will be understood that this element 42 may for this reason be comprised merely of a simple potentiometer which is driven by a small D.C. motor. The motor is normally at rest, and the potentiometer produces a particular output which when applied to the VCO 40 produces a 60 kc. signal. Upon occurrence of a trigger signal from trigger 31 monitoring the fact that the motor 14 has attained rated speed, this small servo motor is started and moves the potentiometer up in such a manner that it reaches its end after about 30 seconds whereupon the motor rapidly returns the tap of the potentiometer to zero.

It should be mentioned that the tape speed in system II, for example, is on the order of up to a hundred inches per second or even above. The maximum frequency furnished by VCO 40 at the end of its sweep operation may, for example be 100 kc. Thus a sweep rate of 30 seconds produces a change in frequency of $4.10^4$ c.p.s. per 30 seconds, i.e., 1.3 c.p.s. per millisecond. At a tape speed of 0.1″ per millisecond, the change of frequency of the recorded signal on any given tape portion is thus a very gradual one.

When the network 42 has reached the end of its particular cycle it produces an output signal into a switch control line 46 which operates for opening switch 39, thus terminating the recording of any VCO output signal on either tape in either system. In addition, this signal in line 46 is passed into line **28*a* to render system I ineffective, i.e., to stop the motor therein. The closing of gate 32*a* may be performed autonomously by system I, however, further operational steps in system I are quite unimportant at that point. This completes the recording of system I, and the recording proceeds by system II and on tape 12** thereof.

It will be understood that, for example, when the end of tape 12 has almost been reached, a third tape system or the reloaded first system (if similar) can be controlled in a similar manner to operatively couple the end of tape 12 to another tape to continue recording. First, then, the switch 39 is closed by a tape metering device for system II, and again the VCO 40 provides its 60 kc. output signal to record this by multiplexing into the synch track of tape 12. The metering device for this system II causes the other system (system I or another system) to start up, and when the other system has reached its rated tape speed, then the ocillator 42 is triggered again and provides its rising output, and again the sweep frequency is produced by the VCO 40, now to be inscribed at the end of tape 12 and the beginning of the new tape in for example, system I.

It can be seen that this way the recording can be continued indefinitely and irrespective of the capacity of any individual tape. In the following it will be described how two tapes can be operatively coupled together, the tapes still being located in different systems but permitting uninterrupted reproduction of the recorded data, and particularly the flow of the reproduced data will not be interrupted by a changeover from one system to another when the end of the tape in one system has been reached.

Figure 3:
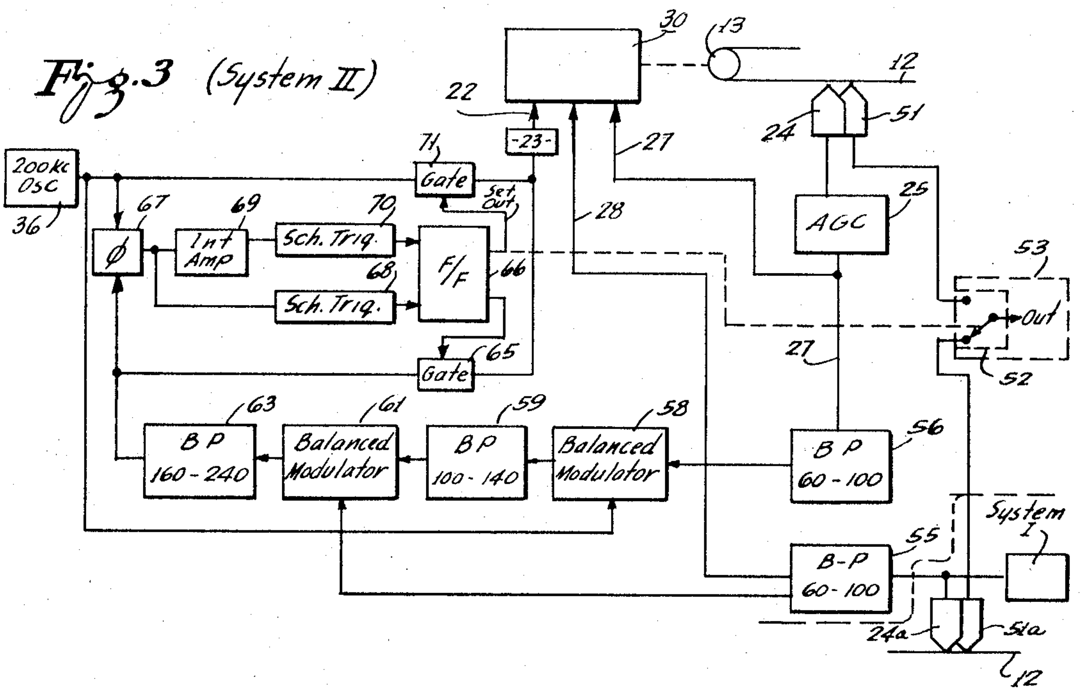
FIGURE 3 illustrates schematically a block diagram of a tape reproducing system whereby with the aid of position representing signals the end of one tape can be synchronized with the beginning of another tape to uninterrupted reproduce data.

Proceeding, therefore, to the description of FIGURE 3 there is shown a network that is necessary to lock the end of one tape to the beginning of another. It may be presumed, that tape 12*a* was recorded as aforedescribed and is to be reproduced, and it is presumed further that at the end of tape 12*a* an uninterrupted changeover in reproduction to tape 12 is desired.

Again it is presumed that the unit 30 describes the control device for capstan 13 for driving the tape 12, but being presently at rest.

Of particular importance is now the input line 22 for the phase detector 21 in unit 30 serving as principal coupling line to system I. System I may or may not be of the same type as during recording, but mandatory for the coupling is the provision of a synch track read transducer 24*a* in system I. Another element for system linking is the input line 27 of system II receiving the output of sync track reading transducer 24. This, of course, is the same during reading as during recording. The switching line 28 is used also in the reproducing mode to start the tape system II, i.e., it particularly controls the energization of the drive motor 14 in unit 30.

In addition to the synch track reading transducer 24 there is shown a data read transducer 51 for system II. As to the system I, only tape 12*a* synch track reading transducer 24*a* and a data reproducing transducer 51*a* are shown. The drive system proper and accuracy with which tape 12*a* in system I is advanced is again immaterial for coupling tape 12 in system II to system I at the end of the tape 12*a*. As symbolically indicated, a switch 52 permits alternative connection of a read-out circuit network 53 to either transducer 51 or to transducer 51*a*. Since changeover from system I to system II is to be discussed, the switch is shown in a position wherein data flow from tape 12*a* and transducer 51*a* into the readout network 53.

The object now is to couple the tape 12*a*, particularly the end thereof to the tape 12 in such a manner that the data flow into the network 53 will not be interrupted by the changeover. The coupling network is provided and composed of the following networks. It will be recalled that the synch tracks on tape 12*a* and tape 12 include a recording of the signals as shown in FIGURE 2. The recorded signals however differ slightly for the two tapes. Only tape 12*a* has multiplexed into its synch track a steady 60 kc. signal which was recorded for the period A–B (FIGURE 2). This is approximatey the average time needed for the motor 14 in system II to start up. However, both tapes have recordings of the sweep frequency signal.

The output signal of synch track reading transducer 24*a* in system I is first fed into a band-pass filter 55 responding to a frequency band from 60 to 100 kc. It is apparent that during normal tape readout of tape 12*a*, no output signal will be passed by band-pass filter 55, because the normal synch track (if any) for the system I may for example be 25 kc. or whatever constant reference frequency is used in the system I, but, of course, it is apparent that this reference frequency recorded as tape binary on tape 12*a* should not include any of the frequencies covered by the VCO 40 during recording. Thus, during normal reproduction of tape 12*a* no output will be produced by unit 55 indeed.

As the end of the tape 12*a* approaches, the 60 kc. signal appears in the transducer 24*a* and band-pass filter 55 produces an output. This output is first fed immediately as command signal into the command line 28 to start up the motor 14 in the unit 30 of system II. Thus, motor 14 starts to run and capstan 13 advances tape 12. Since the rewound tape position out of which the starting occurs is the same during recording as well as during playback, the tape 12 will advance during the acceleration period for approximately the same distance as when it was started during the recording mode. The motor 14 will have attained rated speed approximately but, of course, not exactly after the same period of time A–B now measured from the instant of a first signal at filter 55.

Depending upon the accuracy with which the tape 12 in system I is position controlled, the steady 60 kc. signal will be reproduced from tape 12*a* for the period AB, any devitation here being the tolerance of the position control as reflected in time. Thus, after approximately the period AB, the output frequency of band-pass filter 55 begins to rise in accordance with the picking up of the sweep frequency signal which was recorded on tape 12*a*.

Somewhat before or somewhat after the time of rising frequency at filter 55, the sync track read transducer 24 monitoring the synch track on tape 12 in system II will likewise pick up this sweep frequency signal which was concurrently recorded on tapes 12 and 12*a*. This sweep frequency signal as derived from transducer 24 is passed into a band-pass filter 56. The output signal of band-pass filter 56 is fed to a balanced modulator 58 as a modulator signal. The carrier signal of this balanced modulator is derived from the 200 kc. reference source 36 which may pertain to system II.

The balanced modulator 58 may in addition include a phase splitter, and its output is passed into a band-pass filter 59 having a passing range of 100 to 140 kc.

During progression of tape 12 in system II the first signal picked up by the band-pass filter 56 is 60 kc., but immediately the frequency of this signal gradually increases up to 100 kc. Network 58 is to be a balanced modulator as stated, and since the carrier frequency is 200 kc., the output of this band-pass filter 59 is the lower side band, i.e., a signal which at first is 140 kc., and then gradually decreases to 100 kc., with the progression of tape 12.

The band-pass filter 59 insures that only this lower side band can be passed onto a second, balanced modulator 61. The output of band-pass filter 59 is the carrier signal for the balanced modulator 61 and the modulator signal for the balanced modulator 61 is provided by the output of band-pass filter 55, which is a signal having at first a constant frequency of 60 kc. and it gradually rises to 100 kc. as tape 12*a* progresses further towards its end.

It is apparent that with a 100 to 140 kc. carrier frequency on one hand, and a 60 to 100 kc. modulator signal on the other hand, the upper sideband signal as provided by balanced modulator 61 may vary from 160 kc. to 240 kc. (if carrier and modulator signal were to vary independently). Accordingly at the output side of balanced modulator 61 there is provided a band-pass filter 63 having a passage range of 160 to 240 kc.

It is apparent that only by pure accident the instaneous values of the two outputs of band-pass filters 55 and 56 when produced first can be equal at that instant, and this is highly improbable because one of the tapes will always be slightly ahead of the other tape as far as relative position is concerned in comparison with their respective position during previous concurrent recording. This, of course, holds true even though the tapes at that time may move at the same speed, and even if both tapes are controlled by frequency discriminators in servo loops as outlined above. Thus the tapes may run at corresponding speeds but their relative positions differ. To state it differently, if at the time when tape 12 runs at rated speed, data were picked up from both tapes, there would be a difference, because the instantaneous relative position of the two tapes to each other is different as was during concurrent recording. Of course, data flow from tape 12*a* up to this point continuously and uninterruptedly, but if at the time tape 12 has attained rated speed, the data on tape 12 were monitored, they either might be too far ahead or there might be repetition of data in comparison with the still continued data flow from tape 12*a* depending on whether the tape 12 is leading or lagging relative to the tape 12*a* with respect to the position they had when data were recorded concurrently.

Considering briefly the relationship between the elements 58, 59, 61 and 63 the following can be said. If at any given time the frequency passed by band-pass filter 56 is $f$, and if at the same time the frequency passed by band-pass filter 55 is $fa$, then the arrangement of modulators and band-pass filters produces the following results: The output of balanced modulators 58 is 200 kc. $\pm f$, and since the lower sideband is used here, the band-pass filter 59 indeed passes the frequency 200 kc.$-f$. Of course, $f$ can only be within the range of 60 to 100 kc. due to the particular recording. Thus, the carrier input for balanced modulator 61 is 200 kc.$-f$. The balanced modulator 61 obtains the frequency $fa$ from band-pass filter 55 as modulator. Only the upper sideband of modulator 61 is passed by the band-pass filter 63. Therefore, the upper sideband frequency is 200 kc.$-f+fa$.

Thus, if at any instant the frequencies of the two reference signals as respectively derived from tapes 12 and 12*a* via band-pass filter 55 or 56 are equal, then $f=fa$ and the output signal as derived from filter 63 is precisely 200 kc. This holds true regardless of the value of frequency $f$ or $fa$, thus permitting that it is a variable one.

If the frequencies of the transducer signals are different, then the output of band-pass filter 63 will be 200 kc. plus the instantaneous difference in frequencies $fa-f$ as provided by band-pass filters 55 and 56. The difference or incremental frequency will be positive in case the instantaneous frequency $fa$ as passed by the band-pass filter 55 is higher than the frequency $f$ of the signal concurrently derived from band-pass filter 56. This incremental frequency $fa-f$ added to the 200 kc. value at the output side of band-pass filter 63 will be negative in case the relationship between the outputs of band-pass filters 55 and 56 is a reverse one.

Due to the particular characteristics of the sweep frequency reference signal, the instantaneous frequency of the signal as picked up by transducer 24 and passed through filter 56 is an exact and positive indication of the instantaneous position of the tape 12. The same holds true for system I, in that as soon as the output frequency of filter 55 goes up, it is an exact and positive indication of the instantaneous position of tape 12*a*.

Considering now the fact that the two signals which at any instant are being derived from tapes 12*a* and 12 via band-pass filters 55 and 56 were recorded simultaneously, this incremental frequency value, which is the instantaneous difference between the outputs of band-pass filters 55 and 56, should be zero whenever the tapes 12*a* and 12 in the reproduction mode as presently described advance in the same relative phase position as they did during recording. This is the desired phase locking of the end of tape 12*a* to the beginning of tape 12.

Of course, this phase locking will not occur without additional manipulation. Thus, as soon as the synch track reproducing transducer 24 picks up the beginning of the sweep frequency signal on tape 12, the synch track transducer 24*a* may still pick up the steady 60 kc., or the sweep portion of the signal on tape 12*a* may have already appeared somewhat earlier. In the first case, tape 12 attained rated speed somewhat faster than in the period of time AB measuring the starting time of tape 12 during recording. If the starting of tape 12 was fast, then the frequency of the output of band-pass filter 56 will begin to rise from 60 kc., while the output of filter 55 is still 60 kc. and will begin to rise towards the 100 kc. value somewhat later.

Thus, if at any instant after starting of tape 12 the frequency $f$ of the output of band-pass filter 56 is higher than the frequency $fa$ furnished at the time by band-pass filter 55, then the tape 12 is too far ahead of tape 12, and this is evidenced by a negative incremental frequency $fa-f$, and the output frequency of band-pass filter 63 will be below 200 kc.; if the frequency of band-pass filter 56 is lower than frequency $fa$ of band-pass filter 55, tape 12 will be lagging in position behind tape 12*a*, and the incremental frequency $fa-fl$ will be positive, so that the output frequency of band-pass filter 63 will be above 200 kc.

In case the instantaneous output of band-pass filter 56 has a frequency $f$ below the frequency $fa$ produced the band-pass filter 55 indicating a lagging tape 12, a temporary speeding up of this tape 12 is necessary to phase lock the two tapes into the correlated position which they had during recording. The resulting frequency which is above 200 kc. of filter 63 is used for this purpose. Conversely, if the tape 12 leads the instantaneous output frequency of band-pass filter 56 will be above that of band-pass filter 55 so that the output of band-pass filter 63 will then be somewhat below 200 kc., and this output of band-pass filter 63 can likewise be used to temporarily retard movement of tape 12.

This control action is accomplished by using the output of filter 63 during the initial period as reference signal for the fine and position control in unit 30. Thus, for this purpose there is a gate 65 provided which is opened by a flip-flop 66, and the output of gate 65 leads into countdown device 23 and the reference input line 22 for the phase detector 21 in driving unit 30.

It will be recalled, that the sweep reference signal has a change in frequency which was very gradual, i.e., in the range of about one c.p.s. per millisecond. Thus, the incremental frequency $f-fa$ will be very small indeed. The phase detector 21 in unit 30 will receive signals which differ slightly in frequency, one being the tape binaries, the other being derived from filter 63, but this establishes quasi-stationary phase differences changing at so low a rate, that the motor 14 is capable of following such changes. In view of the high frequency responses possessed by motor 14, and in view of the resulting small time constant of the feedback loop for position control of motor 14 in unit 30, there is a resulting D.C. component (i.e. true phase difference) at the output of phase detector 21 having a sign which will cause speed up or slow down of motor 14 so that the frequencies $f$ and $fa$ tend to become equal and filter 63 will then pass a true 200 kc. signal.

Since the 200 kc. signal of filter 63 is ultimately derived as carrier from source 36, it is phase coherent therewith. Thus, when the condition or mode $f=fa$ has been reached, system II can be switched over to the source 36 for position control, since phase locking between tapes 12 and 12*a* is then attained and there is inherent phase locking to oscillator 36. Likewise, at that time readout of data can be changed over from system I to system II. This is controlled as follows: A phase detector 67 is provided which compares the output of reference signal source 36 with the output of band-pass filter 63. As long as there is a difference in phase or frequency, an output is produced just as is done by the detector 21 in unit 30. The output of phase detector 67 is passed into a Schmitt trigger 68 having its output connected to the reset input side of a flip-flop 66 to reset flip-flop 66 when set. The reset output signal of the flip-flop 66 when true is used to gate open the gate 65 so that the output of band-pass filter 63 is passed into the input line 22 for fine control of unit 30 during the phase locking mode of the two systems. The thus modified reference signal for the unit 30 temporarily slows down or advances the tape as stated.

As was stated above, the output of band-pass filter 63 is phase coherent with the output of oscillator 36, when tape 12 is phase locked to tape 12*a*, but concurrently thereto, phase locking is then present in between the reference signal and the tape binaries read from tape 12. The phase locking position as between the tapes is monitored by the phase detector 67 in that its output drops to zero (D.C. and A.C.-wise). The Schmitt trigger 68 then discontinues to provide any reset input signal to the flip-flop 66. However, the flip-flop 66 maintains its reset condition until it is being set.

Flip-flop 66 can be set via a delaying network which, for example, may comprise an integrating amplifier 69 monitoring the output of phase detector 67. As soon as the output of detector 67 is zero for an extended period of time, the output of integrator amplifier 69 runs down. A second Schmitt trigger 70 is coupled to amplifier 69 in such a manner, that it produces an output only when the amplifier output 69 is zero or below a threshold value.

Thus when integrating amplifier 69 ceases to produce an output, Schmitt trigger 70 produces an output signal which is applied as trigger signal to the input set side of flip-flop 66 when shifting the same into the set state. Thereupon gate 65 becomes blocked but a gate 71 is being opened. Gate 71 permits the 200 kc. signal from reference source 36 to pass into the input control line 22 of the unit 30.

The flip-flop 66 in addition controls another gate assembly symbolically noted with reference number 52 which shifts the data flow from data read transducers 51*a* cooperating with tape 12*a*, to data read transduecrs 51 monitoring the data tracks of tape 12. Since this changeover occurs at a time when a complete phase lock is attained between the end of tape 12*a* and the beginning of tape 12, it is assured that at the time the read transducers 51 and 51*a* read the same data, and at that time a changeover from data readout by transducer 51*a* to data readout by transducer 51 is permissible indeed without providing an interruption of data flow.

Figure 4:
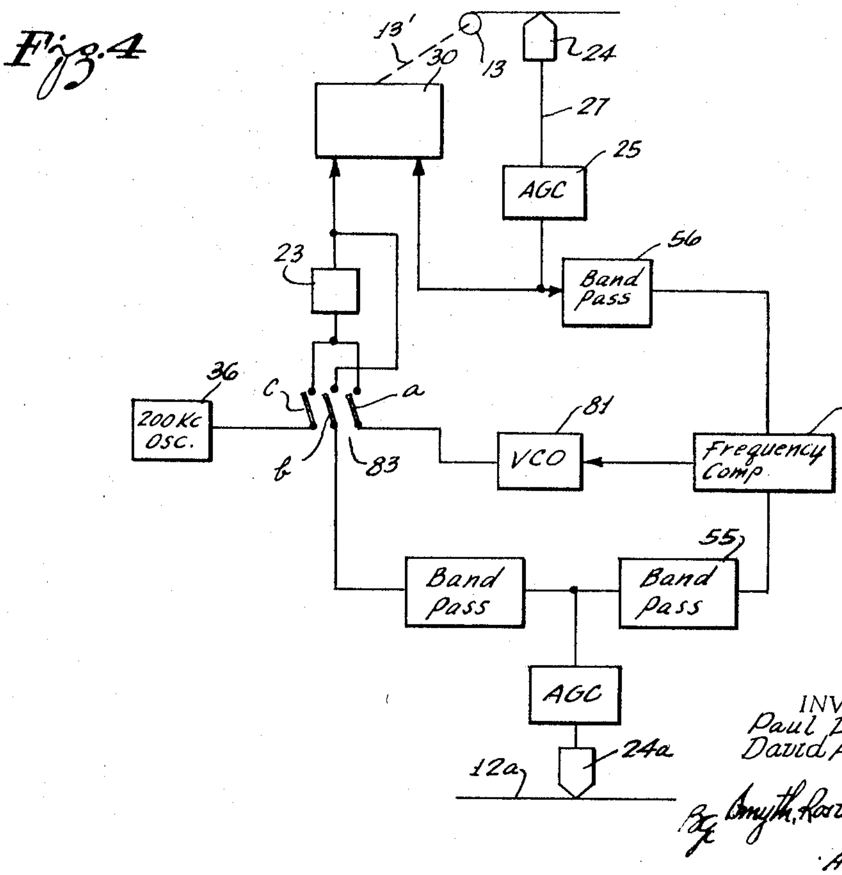
FIGURE 4 illustrates a modified system for tape position synchronization in the reproducing mode.

Proceeding now to the description of FIGURE 4 there is shown a somewhat simplified version of the invention which still can be used with similar results. In this case it is presumed that the two tape systems use the same reference signal source during the transition period for concurrence recording as well as reproducing. The recording system otherwise may have been the same as shown in FIGURE 1, and the FIGURE 4 illustrates the playback system only. There is again provided the sync track read transducer 24*a* for tape 12*a*, and the sync track read transducer 24 for tape 12. There are the two band-pass filters 56 and 55 respectively providing outputs indicative of the passage of the sweep frequency signals which were recorded as a position lock representation of the tapes 12*a* and 12 as aforedescribed.

The output signals of the two band-pass filters are now fed to a frequency comparator 80 producing strictly a D.C. output voltage which is indicative of the instantaneous frequency deviation and representing the same situation as was outlined above, whereby in particular now the sign of the D.C. output of frequency comparator 80 is a representation of whether the tape 12 lags or leads relative to tape 12*a* after starting. The D.C. output signal of frequency comparator 80 is passed to a voltage control oscillator 81. The voltage control oscillator 81 is biased in such a manner, that in case the output of frequency comparator 80 is zero the output of VCO 81 is precisely 200 kc. In case there is a difference in frequency as between the two signals passed by filters 55 and 56, the resulting D.C. voltage furnished by frequency comparator 80 changes the frequency of the VCO 81 so as to provide a reference signal into the control line 22 for unit 30 in the same manner and for the same purpose as was outlined above. For this purpose switch 83*a* is closed during this phase locking mode.

However, it is apparent that at the time the beginning of tape 12 phase locks to the end of tape 12*a* the output signal of VCO 81 has a completely arbitrary phase to that of the continuously running oscillator 36. In order to avoid any phase jumping, use can be made of the fact that at the original recording the reference signal was recorded concurrently on tapes 12*a* and 12, so that subsequent to a position lock of the two tapes, the two sync tracks can be likewise phase locked without disturbing the position lock.

Thus, prior to the time of changeover of data flow from tape 12*a* to tape 12, but subsequent to zero output of comparator 80, switch 83*b* connects the line 22 directly to the tape transducer 24*a* so that the tape binaries of system I serve as reference for system II. When the position control for system II has stabilized, the system II is now in fact phase locked to reference source 36 because the latter is also the reference for the position control of system I.

Now changeover of data readout from system I for system II may occur and concurrently the reference source 36 is connected by switch 83*c* to line 22 without producing any phase control jump. The switches 83*a*, *b*, and *c* may, of course, be understood as a symbolic representation of a gate system.

In case different reference frequency sources have been used during recording, but the same is used during playback, still no significant problem arises as to phase jumping, but loop stabilization for system II for each switch position of switch 83 may take a trifle longer. In case the reference frequencies are provided for each unit from separate sources, a phase jump is unavoidable when the position control is taken over by source 36 of system II. However, this will not result in any skipping or repetition of data because it occurs after system changeover. Since the frequency of oscillator 36 is eight times that of the binaries proper as used for control, the resulting phase jump as between the 25 kc. signals is still minor. Here it is of importance, that the phase locking control provided by phase locking the two sweep signals occurs in a much higher frequency range and with a higher degree of accuracy, so that any phase difference on the 25 kc. level is minor indeed.

What is claimed is:

1. A tape recording and reproducing system which includes means for advancing a first magnetic tape past a recording and a reproducing station, and wherein said tape serves to provide an extension for storage of data the flow of which may exceed the capacity of a second magnetic tape recording and reproducing system, for permitting uninterrupted recording and reproducing of data subsequent to the recording and reproducing operation of said second system, the combination comprising:

means for receiving from said second system a signal to start said tape advancing means;

first control means including a phase detector to position control said tape advance means by comparing an A.C. signal representing the instantaneous position of said tape with a standard frequency signal;

first signal means to receive a variable frequency signal as position representation of limited duration and as concurrently received and recorded on the end of the tape of said second system;

means including said recording station for recording said variable frequency signal on said first tape to provide an extended position correlation as between the beginning of the first tape and the end of the second tape, and for recording data on said first tape at least subsequently to the recording of said signal;

second signal means to receive from said second system a reproduction of said position representing signal;

third signal means responsive to the position representing signal as reproduced from said first tape;

fourth signal means connected to said second and third signal means and being responsive to the instantaneous difference in frequency as between said two reproduced position representing signals; and control means responsive to said difference for providing an A.C. control signal differing in frequency from said standard frequency and feeding said A.C. control signal to said first control means as temporary substitution of said standard frequency thereby controlling the instantaneous speed of said tape advancing means to place said first tape into a position so that said two reproduced position representing signals become equal as an indication that the data then reproduced in said second system correspond to the data reproducibly presented by said first tape at said reproducing station.

2. A system as set forth in claim 1, said fourth signal means including means for combining the respectively reproduced variable frequency signals with said standard frequency signal, so as to provide phase coherence therewith.

3. A tape recording and reproducing system which includes means for advancing a first magnetic tape past a recording and a reproducing station, and wherein said tape serves to provide an extension for storage of data the flow of which may exceed the capacity of a second magnetic tape recording and reproducing system, for permitting uninterrupted recording and reproducing of data subsequent to the recording and reproducing operation of said second system, the combination comprising:

means for receiving from said second system a signal to start said tape advancing means;

a source of standard frequency reference signals;

means for producing an A.C. signal the frequency of which representing progression of said tape and the phase of which representing the instantaneous position of said tape;

control means for controlling the speed of said advancing means in response to a comparison of said reference signal and said A.C. signal;

first signal means to receive an unambiguous position representing signal of limited duration and as concurrently received and recorded on the end of the tape of said second system, to provide an extended position correlation as between the beginning of the first tape and the end of the second tape;

means including said recording station for recording said unambiguous signal on said first tape, and for recording data on said first tape at least subsequently to the recording of said signal;

second signal means to receive from said second system a reproduction of said position representing signal;

third signal means responsive to the position representing signal as reproduced from said first tape;

fourth signal means connected to said second and third signal means and being responsive to the instantaneous difference as between said two reproduced position representing signals and producing an A.C. signal the frequency of which deviating from the frequency of said standard source by a value representative of said difference; and means for temporarily substituting said A.C. signal for said reference signal in said control means for controlling the instantaneous speed of said tape advancing means so as to place said first tape into a position so that said two reproduced position representing signals become equal as an indication that the data then reproduced in said second system correspond to the data reproducibly presented by said first tape at said reproducing station.

4. A system for controlling the transfer of data reproduction from a first tape to a second tape having overlapping data recordings respectively at end and beginning portions, identified on each tape by phase synchronously recordings of a control signal of monotonically varying characteristics comprising:

first means coupled to the first and second tapes for independently advancing them, the second tape having been started towards the end of reproduction from the first tape;

transducers respectively coupled to the first and second tapes to reproduce said control signals and providing respectively first and second control signals;

circuit means connected to the transducers to be responsive to the first and second control signals to derive therefrom a third control signal having characteristics representative of the phase difference of the presentation of information recordings by the two tapes for reproduction;

control means including a source of reference signal having specific control characteristics, the control means being connected for controlling the advancing of the second tape;

second means connected to the circuit means and to the control means for causing the third signal to temporarily serve as reference signal for the control of advancing of the second tape until by operation of control means the second signal has varied and, by operation of the circuit means has caused said third signal to assume, at least esentially, the specific control characteristics of said reference signal;

reproducing means for reproducing data from both tapes subsequent to starting of the second tape; and means connected to the circuit means and to the data reproduce means for changing utilization of data as reproduced from the first tape to data as reproduced from the second tape subsequent to the third signals assuming the specific control characteristics.

5. A system for controlling the transfer of data reproduction from a first tape to a second tape having overlapping data recordings respectively at end and beginning portions, identified on each tape by phase synchronously recordings of a control signal of monotonically varying characteristics, comprising:

first means coupled to the first and second tapes for independently advancing them, the second tape having been started towards the end of reproduction from the first tape;

transducers respectively coupled to the first and second tapes to reproduce said control signals and providing respectively first and second control signals;

a source of reference signals having specific control characteristics;

circuit means connected to the transducers to be responsive to the first and second control signals and forming therefrom a third control signal having characteristics differing from the specific control characteristics of the reference signals to the extent the first and second tapes run asynchronously to each other;

control means having means for receiving reference signals and connected for controlling the advancing of the second tape;

second means for selectively feeding the reference signals from the sourc and the third control signals as reference signals to the means for receiving in the control means;

reproducing means for reproducing data from both tapes subsequent to starting of the second tape; and means connected to the circuit means and to the data reproduce means for changing utilization of data as reproduced from the first tape to data as reproduced from the second tape subsequent to the third signals assuming the specific control characteristics.

6. A system as set forth in claim 5, including means connected to the receive reference signals from the source and the third signals and further connected to operate said second means for a changeover from the third signals to the reference signals from the source as reference signals for the control means when said third signal has said specific control characteristics.

7. A system for controlling the transfer of data reproduction from a first tape to a second tape having overlapping data recordings respectively at end and beginning portions, identified on each tape by phase synchronously recordings of a control signal of monotonically varying characteristics, comprising:

first means coupled to the first and second tapes for independently advancing them, the second tape having been started towards the end of data reproduction from the first tape;

transducers respectively coupled to the first and second tapes to reproduce said control signals and providing respectively first and second control signals;

a source of reference signals having particular frequency;

circuit means connected to the transducers to be responsive to the first and second control signals and forming a third control signal deviating in frequency from the particular frequency to the extent the tapes advance asynchronously;

control means having means for receiving reference signals and connected for controlling the advancing of the second tape in response thereto;

second means for selectively feeding the reference signals from the source and the third control signals as reference signals to the means for receiving in the control means;

reproducing means for reproducing data from both tapes subsequent to starting of the second tape; and means connected to the circuit means and to the data reproduce means for changing utilization of data as reproduced from the first tape to data as reproduced from the second tape subsequent to the third signals having assumed the particular frequency due to operation of the control means when receiving the third signals as reference signals.

8. A system as set forth in claim 7, the circuit means connected to the source of reference signals to obtain phase coherency between the reference signals and the third control signals when the tapes advance synchronously.

9. A system as set forth in claim 7, the means for advancing the first tape including second control means connected to be under control of the source of reference signals, there being means for temporarily deriving the reference signals for the control means for the second tape from the second control means prior to changeover to the source.

10. A system as set forth in claim 7, the circuit means including means connected to the source for modulating the reference signals with the first and second control signals to obtain a sideband frequency as third control signal differing from the particular frequency by a value representative of the instantaneous speed and relative position difference of the two tapes, the second means connected to the source and the circuit means to sense phase and frequency similarity or difference as between the reference signal and the third control signal for controlling changeover of connection of the control means from the circuit means to the source.

11. A system as set forth in claim 7, the circuit means including a voltage controlled oscillator connected to be driven from comparison of the first and second control signal, for providing the third control signal.

12. A system as set forth in claim 11, wherein the advance of the first tape is controlled by second control means connected to the source of reference signals, means for deriving from the second control means a fourth signal representing advance of the first tape, and being on the average phase synchronous with the reference signals from the source, the second means including means for connecting the first control means to receive the fourth signal as reference signal after said oscillator has obtained the particular frequency, to obtain phase coherency with the reference signals from the source.

13. A system for controlling motion of a magnetic tape, comprising:

first means coupled to the magnetic tape for advancing the magnetic tape;

second means having relation to the magnetic tape to provide a first signal having frequency and phase representing speed and position of the tape;

third means for providing reference signals at a particular frequency;

fourth means connected to the first, second and third means for controlling the advance of the tape in response to the first signal and the reference signal;

fifth means connected to the first and fourth means for starting the magnetic tape;

sixth means defining a second source of reference signals providing a variable frequency reference signal and connected to the fourth means for controlling the advance of the tape in response to the first signal and the second reference signal during a period subsequent to starting; and means connected to the third and sixth means to change control of the first means from the second to the first reference signals when the reference signals are equal.

References Cited

UNITED STATES PATENTS

| | | | |
|---|---|---|---|
| 1,775,019 | 9/1930 | Cook | 179—100.3 |
| 2,697,754 | 12/1954 | Ranger | 179—100.2 |
| 3,109,898 | 11/1963 | Gray | 179—100.2 |

BERNARD KONICK, *Primary Examiner.*

BARRY L. HALEY, *Assistant Examiner.*

U.S. Cl. X.R.

179—100.2